US008781673B2

(12) United States Patent
Nunn et al.

(10) Patent No.: US 8,781,673 B2
(45) Date of Patent: Jul. 15, 2014

(54) WATER-IN FUEL DETECTION USING DUTY CYCLE CALCULATION

(75) Inventors: Janette Marie Nunn, Plymouth, MI (US); Suzanne Stuber, Livonia, MI (US); David Chester Waskiewicz, Hamburg, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2002 days.

(21) Appl. No.: 11/839,644

(22) Filed: Aug. 16, 2007

(65) Prior Publication Data

US 2009/0048728 A1 Feb. 19, 2009

(51) Int. Cl.
*G06F 17/00* (2006.01)
*G06F 19/00* (2011.01)
*G01F 23/00* (2006.01)

(52) U.S. Cl.
USPC ...... 701/31.3; 701/31.1; 340/438; 340/450.2; 702/50

(58) Field of Classification Search
USPC ........ 701/29, 30, 31, 34, 35, 29.1, 29.7, 31.3, 701/31.7, 32.9, 33.4, 36; 340/438, 439, 340/450, 450.2; 702/50, 52, 55; 73/1.73, 73/19.01, 19.1–19.12
See application file for complete search history.

(56) References Cited

U.S. PATENT DOCUMENTS

| | | | | |
|---|---|---|---|---|
| 4,638,305 | A | 1/1987 | Sutton | |
| 5,078,901 | A | 1/1992 | Sparrow | |
| 5,880,674 | A | 3/1999 | Ufkes et al. | |
| 6,170,470 | B1 | 1/2001 | Clarkson et al. | |
| 6,207,045 | B1 | 3/2001 | Jiang | |
| 6,676,841 | B2 * | 1/2004 | Akins et al. | 210/744 |
| 6,862,932 | B2 | 3/2005 | Zimmermann et al. | |
| 2002/0156557 | A1 | 10/2002 | Gras | |
| 2003/0085180 | A1 | 5/2003 | Akins et al. | |
| 2005/0279406 | A1 | 12/2005 | Atwood et al. | |

OTHER PUBLICATIONS

European Patent Office, International Search Report of GB0814422.2, Nov. 19, 2008, 1 page.

* cited by examiner

*Primary Examiner* — Thomas Tarcza
*Assistant Examiner* — Edward Pipala
(74) *Attorney, Agent, or Firm* — Julia Voutyras; Alleman Hall McCoy Russell & Tuttle LLP

(57) ABSTRACT

A method for operating a vehicle having a fuel system that may include unwanted water is described. The method includes, adjusting an operating parameter in response to a relative amount of high and low readings from a water-in-fuel sensor coupled in the fuel system.

16 Claims, 12 Drawing Sheets

722

$$\text{Duty Cycle} = \frac{\text{water sum(1)} + \text{water sum(2)} + \text{water sum(y)}}{\text{bin size(n)} \times \text{num bins(y)}} \times 100$$

WATER-IN FUEL DETECTION USING DUTY CYCLE CALCULATION

BACKGROUND/SUMMARY

The presence of water in a vehicle fuel system may cause extensive damage to vital engine and fuel system components. The integrity of fuel injectors, pumps, filters, and fuel s may all be subject to degradation if a water-in-fuel condition is allowed to persist. The presence of a water-in-fuel condition may lead to reduced overall lubricity of engine components which may result in scoring of pump plungers and needles. Furthermore, larger amounts of water in a fuel tank may produce an environment at the fuel-water interface that is conducive to microbial growth which may result in the clogging of filters and/or corrosion of metal engine and fuel system components. Overall engine performance may also be negatively impacted as the presence of water may reduce the efficiency of combustion processes.

Today, many vehicle fuel systems may utilize a fuel-water separator to remove water from a fuel system and thereby reduce the likelihood of engine and/or fuel system damage. Often times, an auxiliary water tank is arranged to receive water that has been removed from the fuel system by the fuel-water separator. Typically, a sensor (optical, thermal, or electric conductivity, for example) is coupled to an inner surface of an auxiliary water tank or to an inner surface of a fuel-water separator reservoir at a threshold water level along the vertical axis (when the vehicle is on level ground) of the auxiliary water tank or fuel-water separator reservoir that corresponds to a pre-determined threshold volume of water that has been separated from the fuel system. In other words, when the sensor detects that a threshold level of water has been exceeded, a raw voltage signal may be produced by the sensor that may result in a driver notification via an indicator light or indication sound that informs the driver of a water-in-fuel condition.

The inventors herein, however, have recognized that a binary water-in-fuel detection system such as the one described above, may determine the presence of a water-in-fuel condition inaccurately. During periods of transient vehicle operation such as accelerating, hard braking, turning, parking on a grade, etc., sloshing of water may occur in the vicinity of a sensor that may temporarily cause the sensor to be submerged in water when the overall volume of water within an auxiliary water tank or a fuel-water separator reservoir may be less than the threshold volume of water indicative of a water-in-fuel condition. A transient raw voltage signal may then be produced that results in a false notification of a water-in-fuel condition to the driver of the vehicle In one approach, a method for operating a vehicle having a fuel system that may be contaminated with water is provided. The method comprises adjusting an operating parameter in response to a relative amount of high and low readings from a water-in-fuel sensor coupled in the fuel system. In this way, by using a plurality of high and low readings to determine whether a water-in-fuel condition is present, more robust and reliable determinations of a water-in-fuel condition may be realized during both steady state and transient vehicle operating conditions.

DETAILED DESCRIPTION

Figure 1:
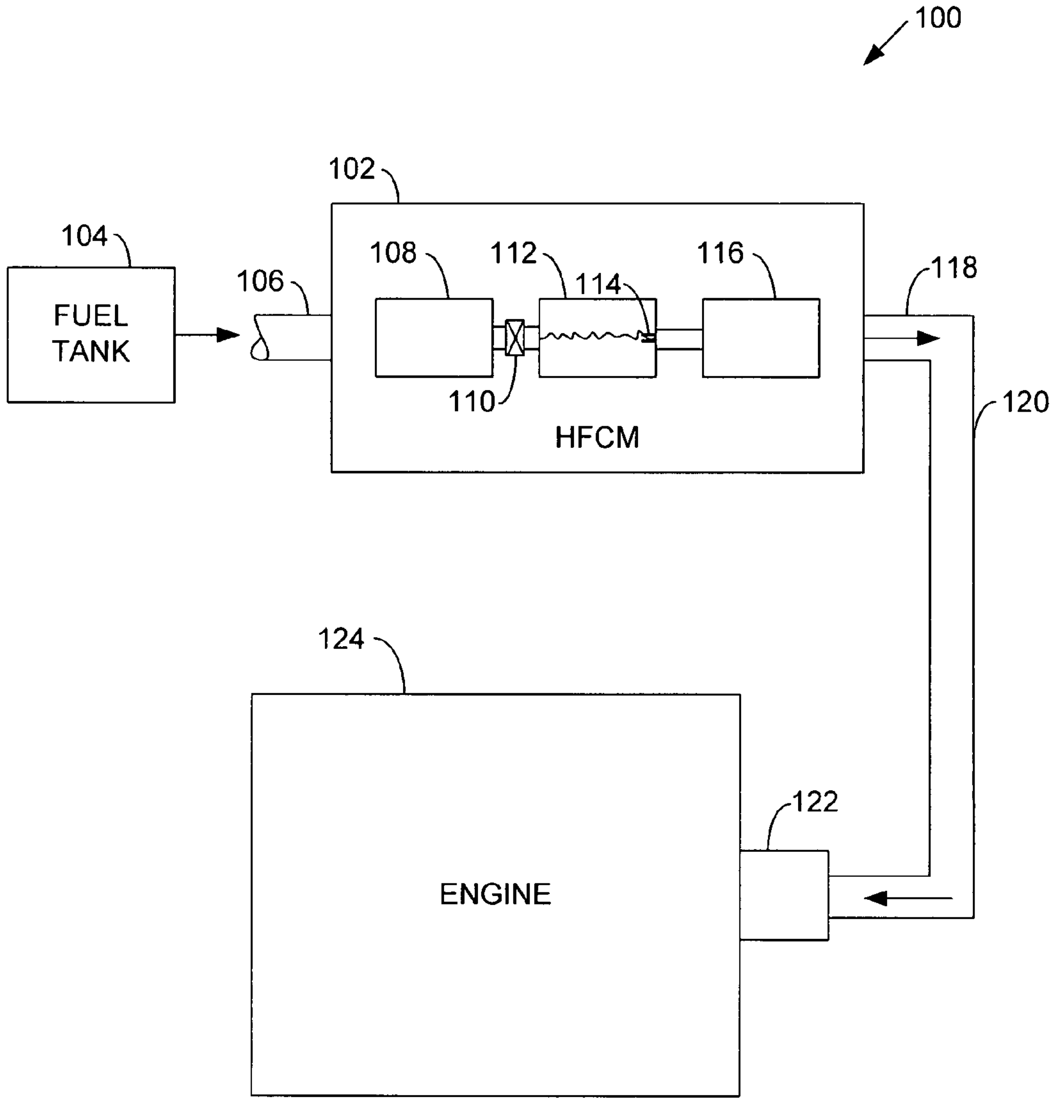
FIG. 1 illustrates a horizontal fuel conditioning module for treating fuel prior to reaching an internal combustion engine.

FIG. 1 illustrates a fuel supply system 100 for supplying fuel to an internal Combustion engine 124. As one non-limiting example, engine 124 includes a diesel engine that produces a mechanical output by combusting a mixture of air and diesel fuel. Alternatively, engine 124 may include other types of engines such as gasoline-burning engines, alcohol-burning engines and combinations thereof, among others. Further, engine 124 may be configured in a propulsion system for a vehicle. Alternatively, engine 124 may be operated in a stationary application, for example, as an electric generator. While fuel supply system 100 may be applicable to stationary applications, it should be appreciated that fuel supply system 100 as described herein, is particularly adapted for vehicle applications.

Fuel supply system 100 may also include one or more of the following: a fuel tank 104, a horizontal fuel conditioning module (HFCM) 102 arranged downstream of fuel tank 104 that receives fuel from fuel tank 104, and a secondary fuel filter 118 arranged downstream of HFCM 102 that may receive fuel from HFCM 102. Additionally, HFCM 102 may house one or more of the following: a fuel heater 108 that may increase the temperature of the fuel, a fuel-water separator 112 that may separate out water that has infiltrated fuel supply system 100 and may then filter the remaining fuel, a water-in-fuel sensor (WIF) 114 that senses the conductivity of the liquid in which it is immersed, a one-way check valve 110 that allows fuel to flow from fuel heater 108 to fuel-water separator 112, and a fuel pump 116. Additionally, fuel supply system 100 may include a plurality of fuel supply pipes or passages for fluidically coupling the various fuel supply system components. For example, as illustrated by FIG. 1, fuel tank 104 may be fluidically coupled to HFCM 102 by fuel supply line 106. Likewise, secondary fuel filter 122 may be fluidically coupled to HFCM 102 by fuel supply line 120.

In some embodiments, fuel-water separator 112, located inside HFCM 102, may be configured as a horizontal reservoir that is defined by a longitudinal axis that is substantially horizontal (e.g. within 0-15 degrees in one example), when the vehicle is on level ground. Additionally, a multi-pronged water-in-fuel sensor (WIF) 114 may be arranged within fuel-water separator 112. WIF sensor 114 may be configured to detect the conductivity of the liquid in which it is immersed by passing a current through the liquid via the prongs of the sensor. Furthermore, it should be appreciated that the various portions of the fuel supply system coupling the various fuel supply system components may include one or more bends or curves to accommodate a particular vehicle arrangement. Further still, it should be appreciated that in some embodiments, fuel supply system 100 may include additional components not illustrated in FIG. 1, such as various valves, pumps, restrictions, etc., or may omit components described herein, or combinations thereof.

Figure 2A:
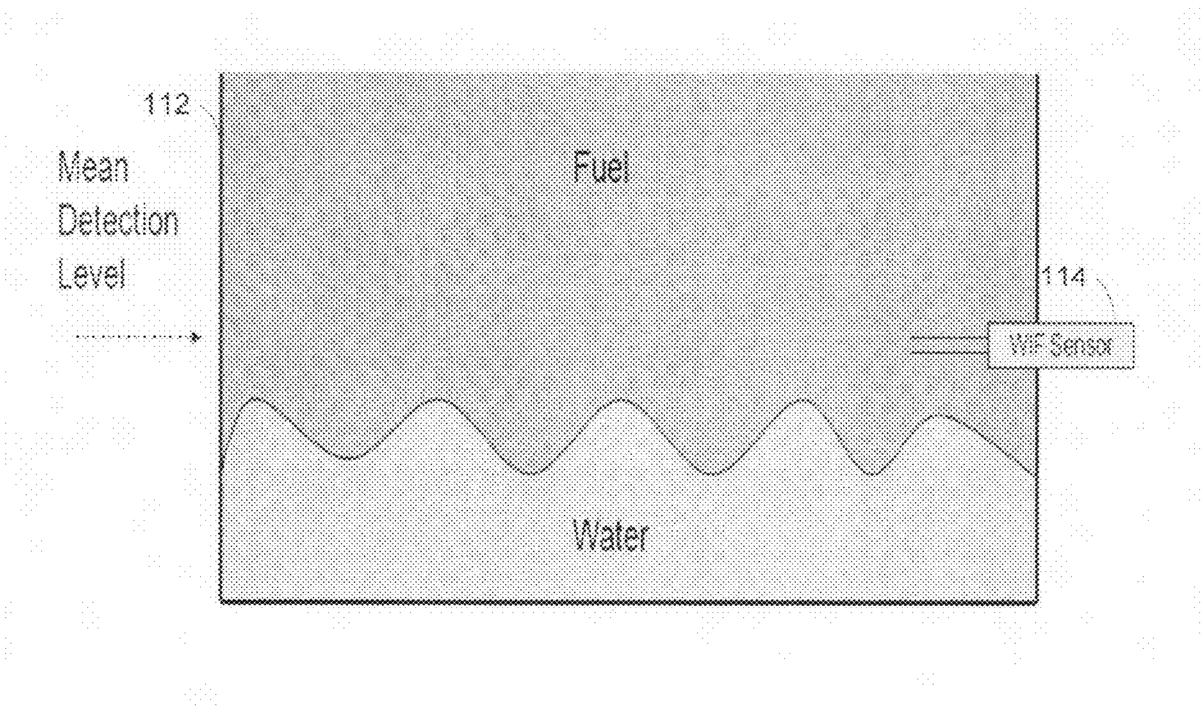
FIG. 2A illustrates a side view of a fuel-water separator in greater detail as a longitudinal cross-section during a lower-sloshing, lower-water content event.

FIG. 2A-2E illustrates a side view of fuel-water separator 112 in greater detail as a longitudinal cross-section during various water content/agitation scenarios. WIF sensor 114 may be arranged as an at least two-prong sensor that indicates the conductivity of the liquid in which it is immersed by measuring the voltage potential between the prongs of the WIF sensor. As the WIF sensor is immersed in different liquids, different voltage potential signals may be produced. Additionally, WIF sensor 114, as illustrated, may be arranged in fuel-water separator 112 such that it indicates the conductivity of the liquid in which it is immersed at a pre-determined mean detection level within the fuel-water separator, one example of which is illustrated in FIG. 2A. For example, a water volume within fuel-water separator 112 that is greater than a threshold water volume may significantly increase the probability of passing water on to the engine. Therefore, WIF sensor 114 may be arranged at a mean detection level along the vertical axis of fuel-water separator 112 corresponding to the threshold water volume such that the WIF sensor detects water only when all of the prongs of the sensor are surrounded by water at the mean detection level.

In a horizontal fuel-water separator configuration, however, sloshing within the separator may be of an amplitude and of a varying nature such that a raw binary voltage signal denoting either water or no water may not be reliable in determining that the water level within fuel-water separator 112 has actually exceeded the mean detection level. To with a fuel-water separator that is configured as a vertical reservoir (defined by a longitudinal axis that is substantially vertical relative to ground (for example within 0-15 degrees of vertical) when the vehicle is on level ground), may display lower amplitude sloshing characteristics when agitated than a fuel-water separator configured as a horizontal reservoir of similar volume. Such a vertical configuration may therefore be better suited for utilizing a direct binary voltage signal that denotes either water or no water due to the decreased impact of sloshing on the voltage signal.

Improved water/no-water detection in a horizontal fuel-water separator configuration displaying higher sloshing characteristics may be realized by applying a duty cycle calculation method to the output of WIF sensor 114. A duty cycle in this example, represents a relative ratio of water-to-no-water per unit time, as detected by WIF sensor 114 (illustrated in more detail with regards to FIG. 7). As opposed to a direct binary voltage configuration which denotes either water or no water (and thus may produce false-positive indications of a threshold water volume being exceeded in higher sloshing conditions), a duty cycle calculation method represents a sampling of the signals output by WIF sensor 114 over time. To determine a condition where the water volume within fuel-water separator 112 has exceeded the water volume level during higher sloshing conditions, a series of duty cycle calculations may be made over a pre-determined period of time (as described in greater detail in regards to FIG. 7). An average duty cycle that is roughly proportional to the amount of water in fuel-water separator 112 may thus be obtained. Taking multiple samples during periods of higher sloshing may therefore reduce accuracy variations when determining a water-in-fuel condition by mitigating the effects of sloshing and various drive cycle related noise factors.

FIG. 2A illustrates a side view of fuel-water separator 112 in greater detail as a longitudinal cross-section during a lower-sloshing, lower-water content event. As illustrated, WIF sensor 114 may be wholly submerged in fuel during a low-sloshing, lower-water content event. During such an event, the WIF sensor may detect primarily only fuel and therefore the voltage level between the prongs of the WIF sensor may not fluctuate substantially from a voltage level indicating little or no water detection to a voltage level indicating water detection. The calculated duty cycle (relative ratio of water detected to no water detected by WIF sensor 114 per unit time) will thus hover around 0-5%, for example.

Figure 2B:
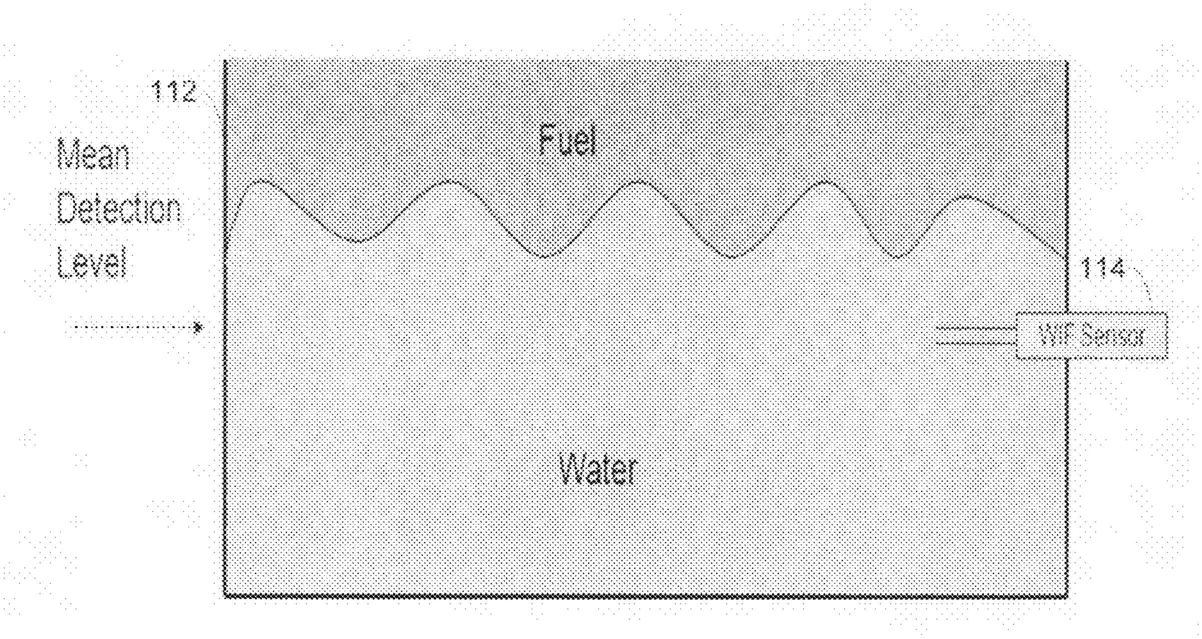
FIG. 2B illustrates a side view of a fuel-water separator in greater detail as a longitudinal cross-section during a lower-sloshing, higher-water content event.

FIG. 2B illustrates a side view of fuel-water separator 112 in greater detail as a longitudinal cross-section during a lower-sloshing, higher-water content event. As illustrated, WIF sensor 114 may be wholly submerged in water during a lower-sloshing, higher-water content event. During such an event, the WIF sensor may detect water for the majority of the event duration and therefore the voltage level between the prongs of the WIF sensor may not fluctuate substantially from a voltage level indicating water detection to a voltage level indicating no water detection, and the duty cycle will thus hover around 95-100%, for example.

Figure 2C:
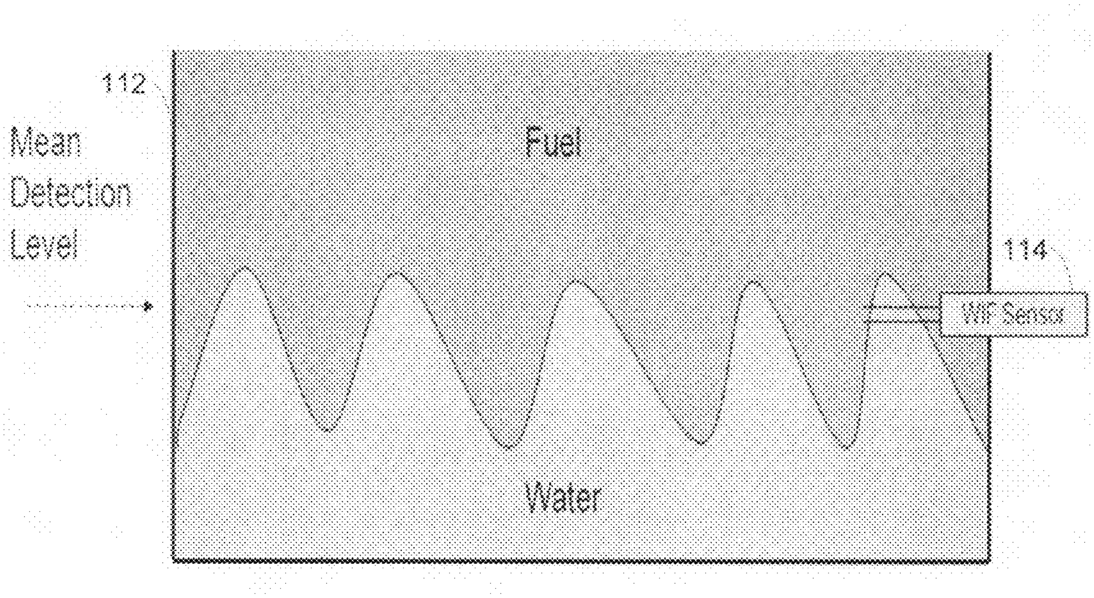
FIG. 2C illustrates a side view of a fuel-water separator in greater detail as a longitudinal cross-section during a high-sloshing, higher-water content event.

FIG. 2C illustrates a side view of fuel-water separator 112 in greater detail as a longitudinal cross-section during a higher-sloshing, lower-water content event. As illustrated, WIF sensor 114 may alternate from being wholly submerged in fuel to being wholly submerged in water during a high-sloshing, low water content event. During such an event, the WIF sensor may detect fuel for more than half of the event and may detect water for less than half of the event. Therefore, the voltage level between the prongs of the WIF sensor may fluctuate between a voltage level indicating no water detection to a voltage level indicating water detection, and the duty cycle may be less than 50% and may be roughly proportional to the volume of water in fuel-water separator 112.

Figure 2D:
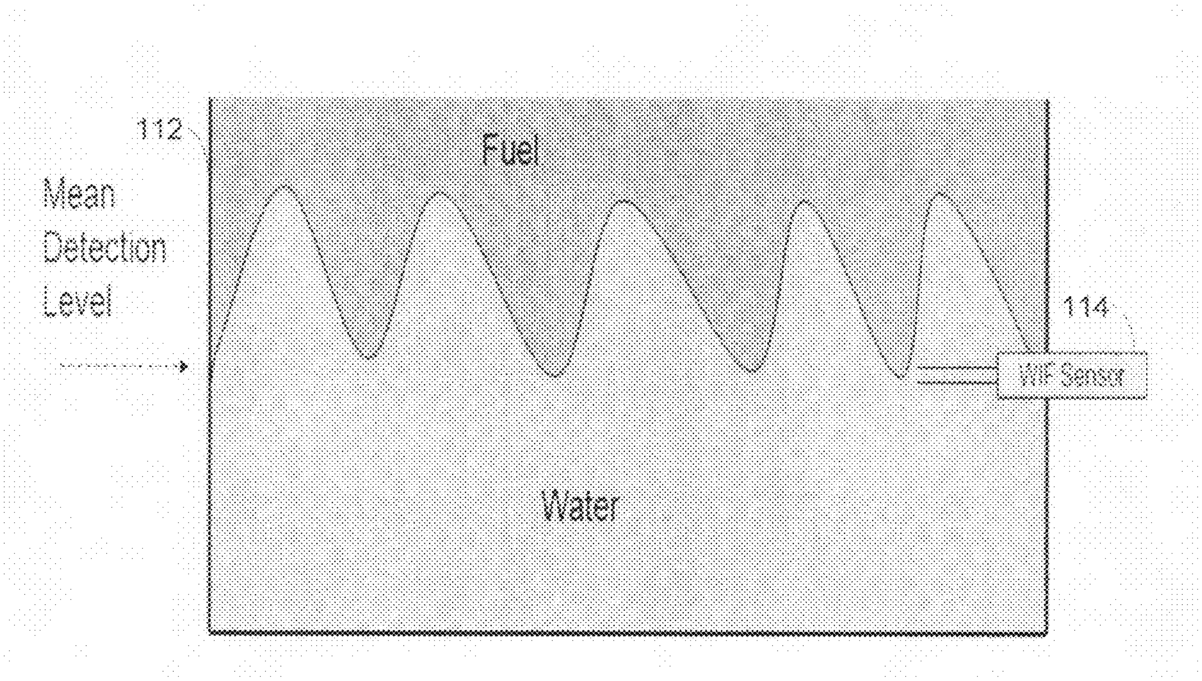
FIG. 2D illustrates a side view of a fuel-water separator in greater detail as a longitudinal cross-section during a higher-sloshing, lower-water content event.

FIG. 2D illustrates a side view of fuel-water separator 112 in greater detail as a longitudinal cross-section during a higher-sloshing, higher-water content event. As illustrated, WIF sensor 114 may alternate from being wholly submerged in fuel to being wholly submerged in water during a higher-sloshing, higher-water content event. During such an event, the WIF sensor may detect water for more than half of the event and may detect fuel for less than half of the event. Therefore, the voltage level between the prongs of the WIF sensor may fluctuate between a voltage level indicating no water detection to a voltage level indicating water detection, and the duty cycle may be more than 50% and may be roughly proportional to the volume of water in fuel-water separator 112.

Figure 2E:
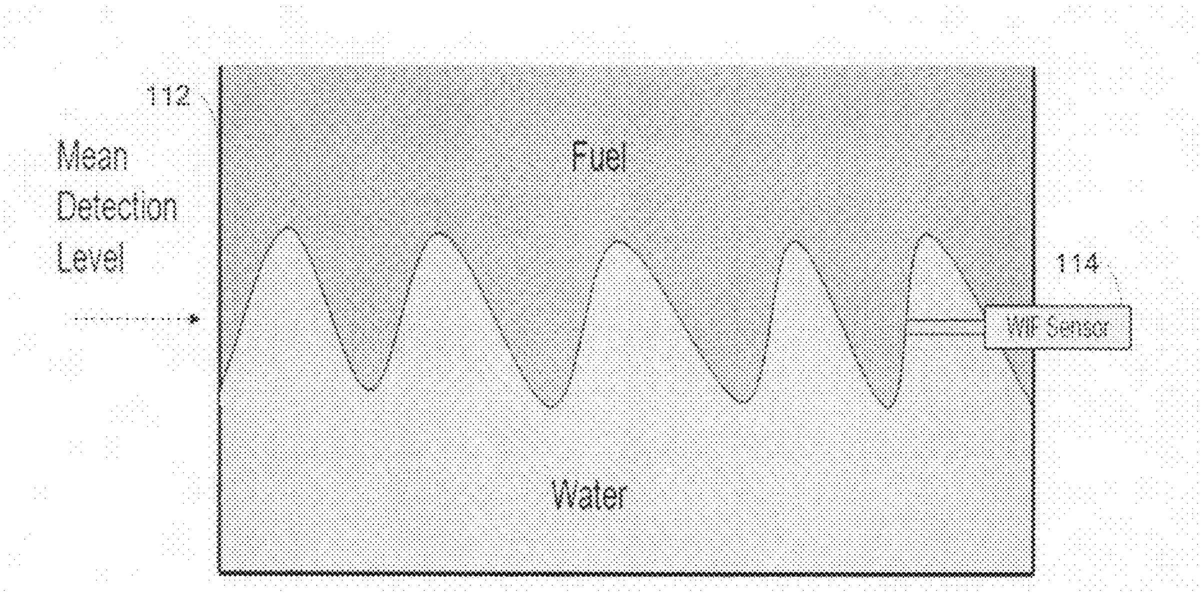
FIG. 2E illustrates a side view of a fuel-water separator in greater detail as a longitudinal cross-section with a mean detection water level during a higher-sloshing event.

FIG. 2E illustrates a side view of fuel-water separator 112 in greater detail as a longitudinal cross-section during a higher-sloshing, mean detection level water content event. As illustrated, WIF sensor 114 may alternate from being wholly submerged in fuel to being wholly submerged in water during a high-sloshing, mean content event. During such an event, the WIF sensor may detect fuel for roughly half of the event and may detect water for roughly the other half of the event. Therefore, the voltage level between the prongs of the WIF sensor may fluctuate equally between a voltage level indicating no water detection to a voltage level indicating water detection, and the duty cycle may thus hover around 50% and may be roughly proportional to the volume of water in fuel-water separator 112.

Figure 3:
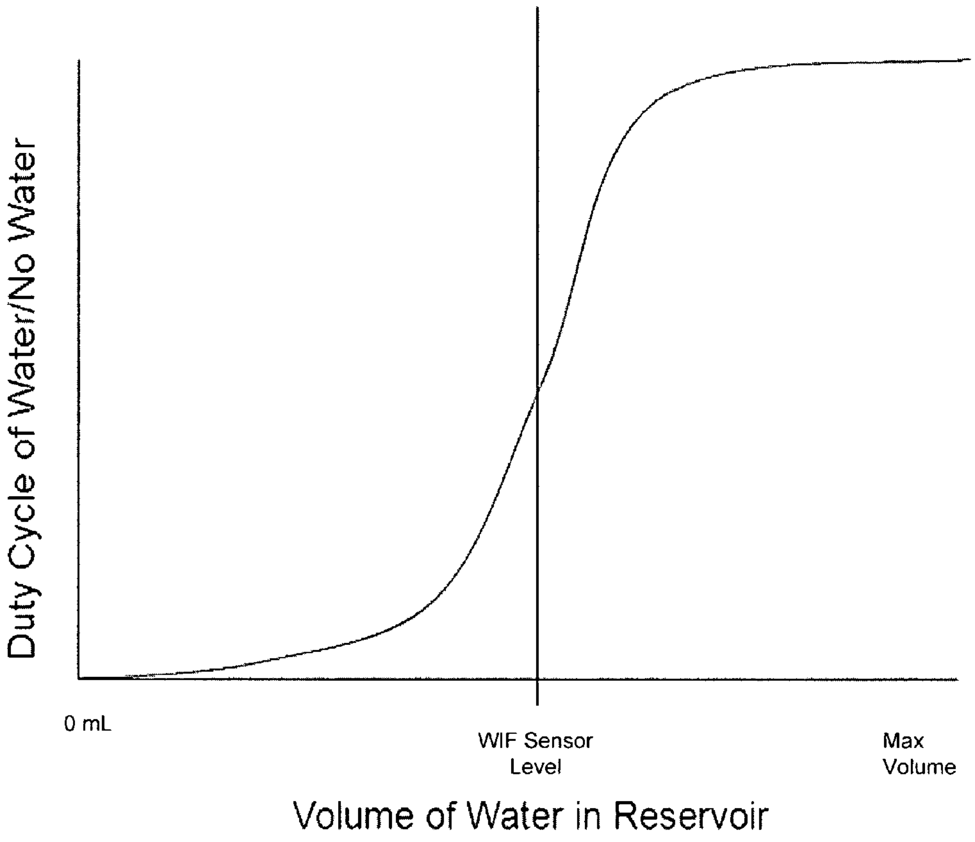
FIG. 3 depicts a graphical representation of a nominal expected transfer function of water-to-no-water duty cycle versus volume of water in a fuel-water separator.

FIG. 3 depicts a graphical representation of a nominal expected transfer function of water-to-no-water duty cycle versus volume of water in fuel-water separator 112. In this graphical representation, the horizontal axis represents the volume of water in fuel-water separator 112 and the vertical axis represents the duty cycle of detected water-to-no-water detected. The vertical line that straddles the approximate center of the depicted transfer function represents the mean detection level of fuel-water separator 112. Thus, the point at which the vertical line depicting the mean detection level of fuel-water separator 112 and the transfer function intersect represents the point at which the combination of water level and sloshing within the fuel-water separator combine to produce a duty cycle of approximately 50%. Furthermore, as illustrated, as the amount of water within fuel-water separator increases, the duty cycle of detected water-to-no-water detected also increases.

Figure 4:
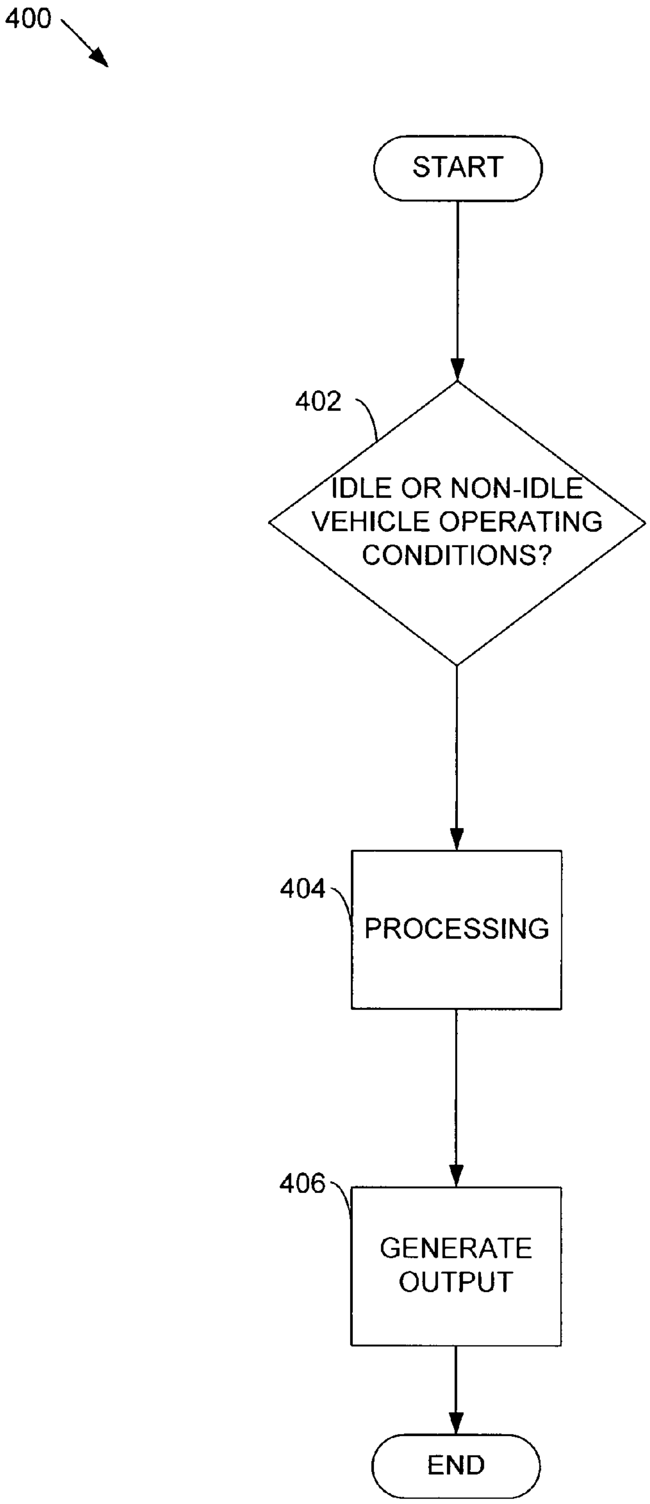
FIG. 4 shows a flow chart depicting an example routine for selecting the mode of data collection for determining the water content of a fuel-water separator.

FIG. 4 shows a flow chart depicting an example routine 400 for selecting the mode of data collection and signal processing for determining the water content of fuel-water separator 112. Depending on the indicated content based on a relative amount of high and low water content readings by WIF sensor 114, various engine and/or vehicle operating parameters may be adjusted. As non-limiting examples, air intake and/or fuel injection pressure/pulsewidth may be adjusted.

Figure 5:
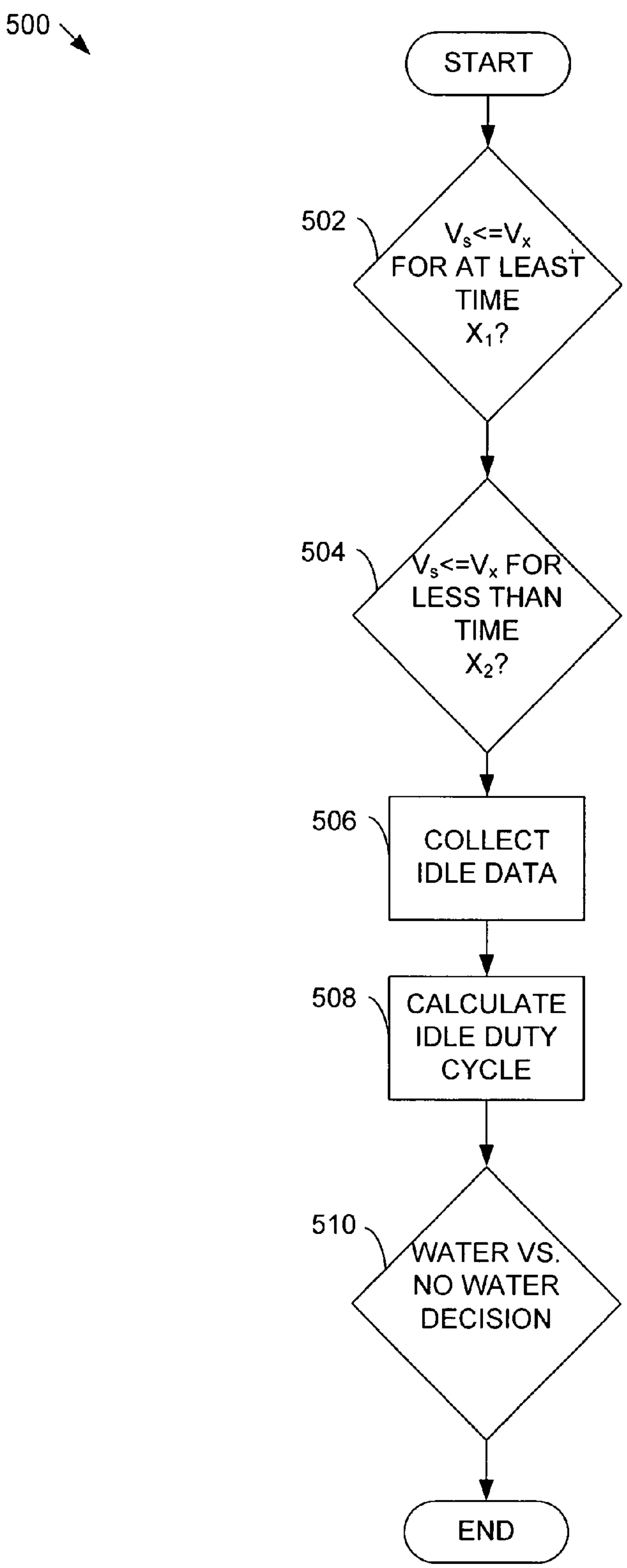
FIG. 5 shows a flow chart depicting an example routine for determining whether idle data collection mode is to be utilized to determine the water content within a fuel-water separator.
Figure 6:
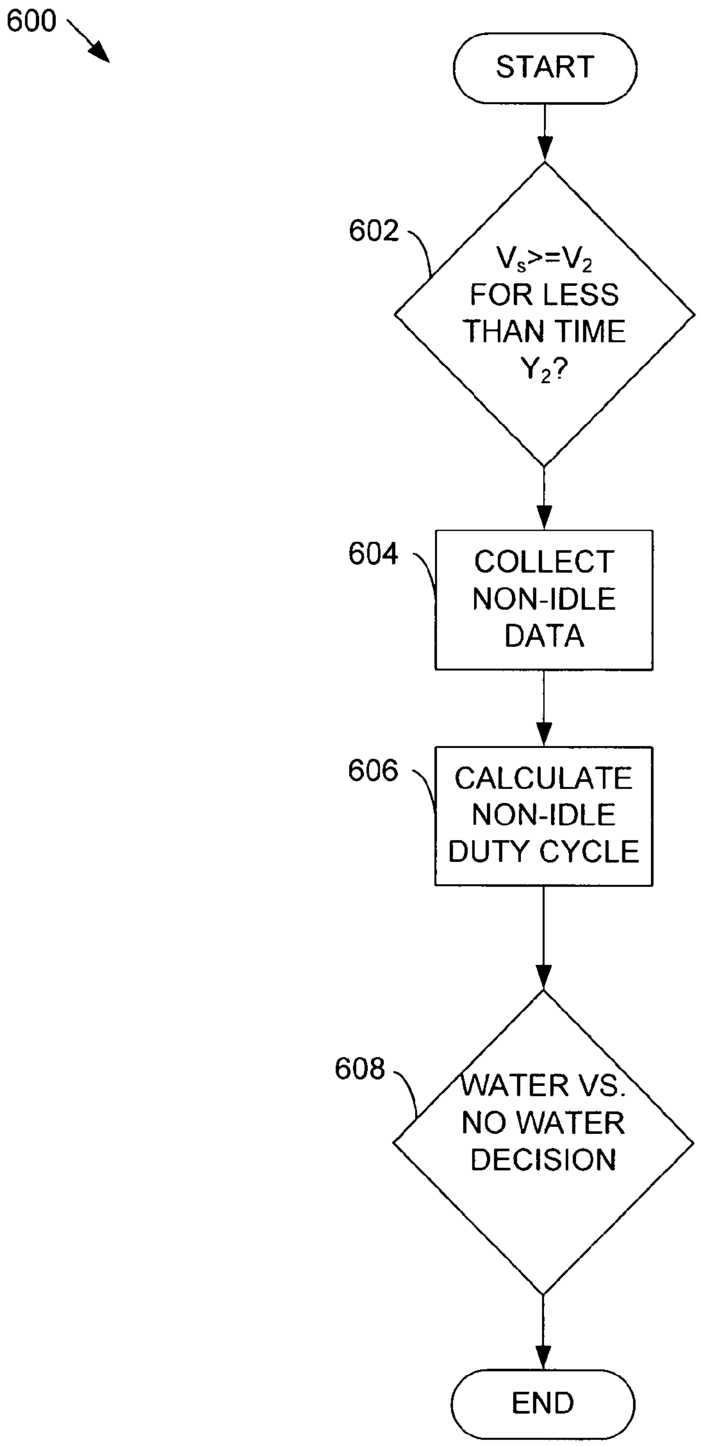
FIG. 6 shows a flow chart depicting an example routine for determining whether non-idle data collection mode is to be utilized to determine the water content within a fuel-water separator.

Referring back to FIG. 4, at 402, it may be judged whether the operating conditions of a vehicle are such that an idle collection data mode or a non-idle data collection mode should be utilized (as illustrated further in FIGS. 5 and 6). Idle collection mode may be utilized when the vehicle is stationary or has been travelling at a creep velocity less than $V_x$ for less than a time $X_2$. During idle data collection mode, a determination of water or no water may be made in less time than a determination in non-idle data collection mode. This is because the lower amount of sloshing during an idle event may reduce the vacillations in the voltage signal output by WIF sensor 114 and therefore an accurate duty cycle may be determined with a lower number of data outputs collected from the WIF sensor. After determining whether idle or non-idle data collection mode should be utilized, routine 400 may proceed to 404.

Figure 7:
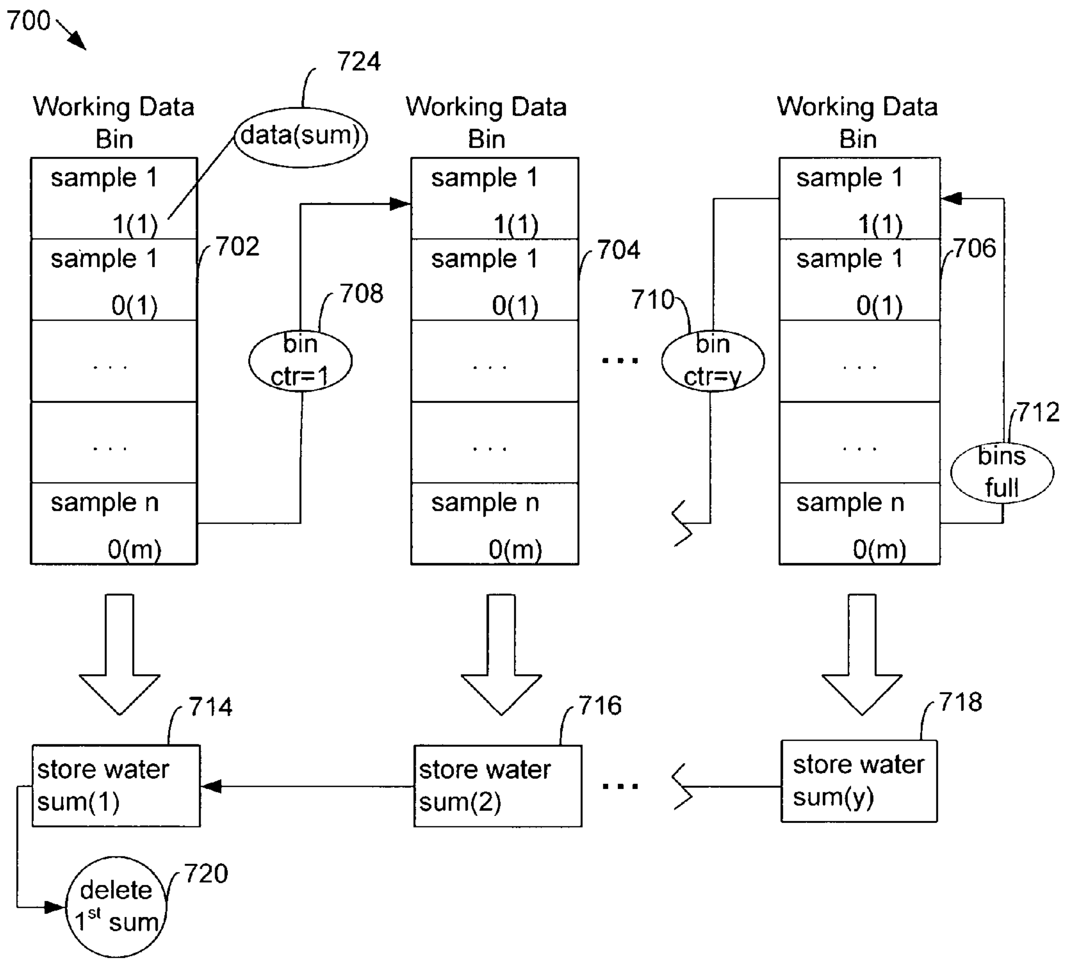
FIG. 7 shows an example illustration depicting idle and non-idle data collection mode and processing and the equation for calculating a duty cycle.
Figure 8:
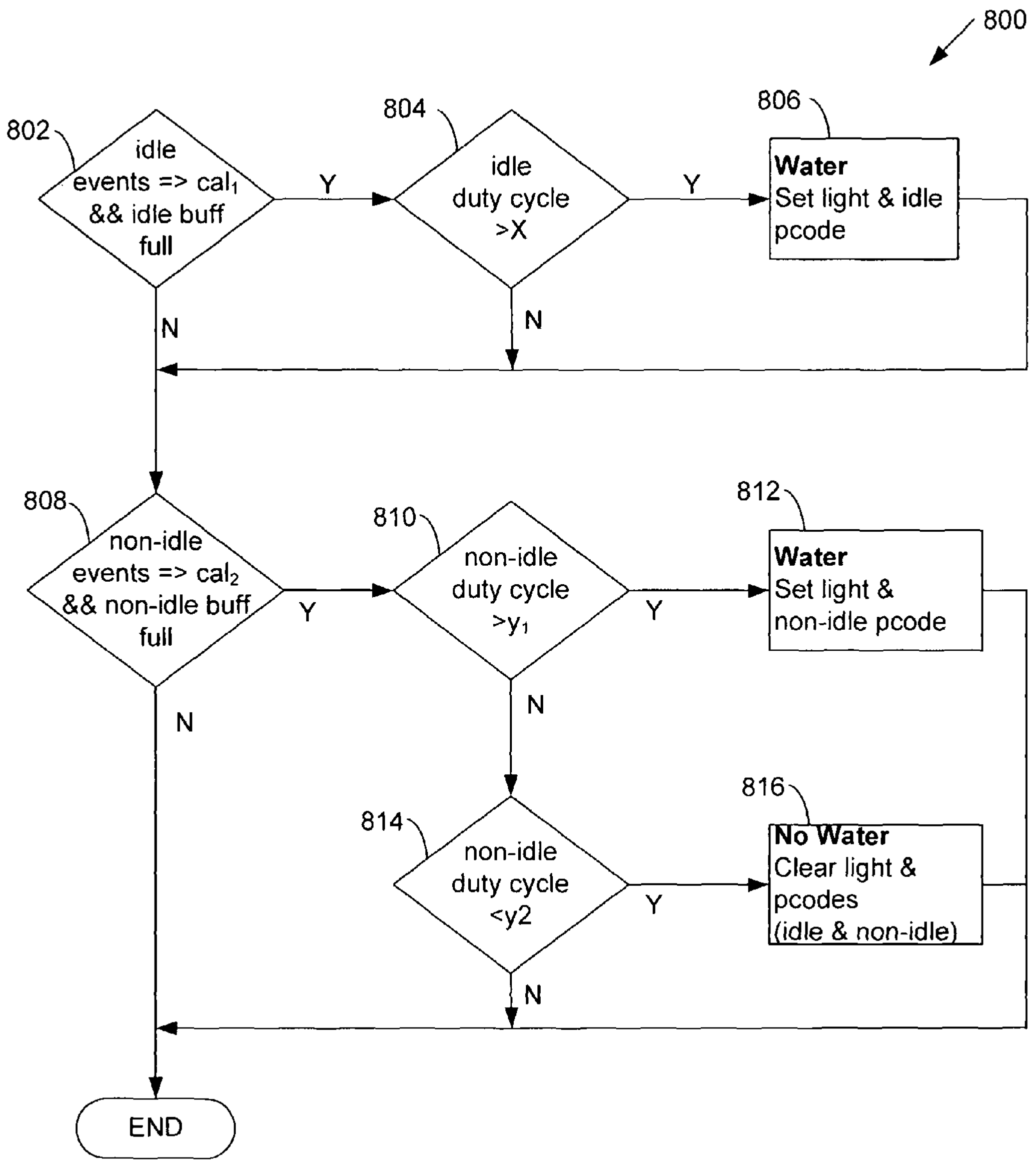
FIG. 8 shows a flow chart depicting an example routine for determining whether there is a water or no-water condition within a fuel-water separator.

At 404 and 406, data may be collected and processed using the collection mode selected at 402 (as illustrated by FIG. 7). At 408, an output may be generated that determines whether an indication light is illuminated to alert the driver of the vehicle to a condition where the water volume in fuel-water separator 112 exceeds a pre-determined volume amount (as illustrated by FIG. 8), and/or whether vehicle operating parameters may be adjusted.

FIG. 5 shows a flow chart depicting an example routine 500 for determining whether an idle event has occurred and therefore that idle data collection mode is to be utilized to determine the water content within fuel-water separator 112. At 502, it may be judged whether the velocity of a vehicle, $V_s$, has continuously been less than or equal to a threshold velocity $V_x$ for at least a time $X_1$. If the answer at 502 is no, then routine 500 may be exited and a routine for determining whether non-idle data collection mode is to be utilized (as illustrated by FIG. 6) may be accessed. Alternatively, if the answer at 502 is yes, then the routine may proceed to 504. At 504, it may be judged whether the velocity of the vehicle, $V_s$, has been less than or equal to a threshold velocity $V_x$ for less than a time $X_2$. If the answer at 504 is no, then the routine may be exited and a routine for determining whether non-idle data collection mode is to be utilized may be accessed. Alternatively, if the answer at 504 is yes, then it has been determined that an idle event has occurred and that idle data collection mode may be used at 506.

At 506, data may be collected using a data bin concept as described in greater detail with regards to FIG. 7. After data has been collected at 506, an idle duty cycle may be calculated at 508, a more detailed description of which may also be found with regards to FIG. 7. At 510, the calculated duty cycle may now be used to make a water vs. no water decision as described in greater detail with regards to FIG. 8.

FIG. 6 shows a flow chart depicting an example routine 600 for determining whether a non-idle event has occurred and therefore that non-idle data collection mode is to be utilized to determine the water content within fuel-water separator 112. At 602, it may be judged whether the velocity of a vehicle, $V_s$, has continuously been greater than or equal to a threshold velocity $V_2$ for less than a time $Y_2$. If the answer at 602 is no, then routine 600 may be exited and a routine for determining whether idle data collection mode is to be utilized (as illustrated by FIG. 5) may be accessed. Alternatively, if the answer at 602 is yes, then it has been determined that a non-idle event has occurred and that non-idle data collection mode may be used at 604. At 604, data may be collected using a data bin concept as described in greater detail with regards to FIG. 7. After data has been collected at 604, a non-idle duty cycle may be calculated at 606, a more detailed description of which may also be found with regards to FIG. 7. At 608, the calculated non-idle duty cycle may now be used to make a water vs. no water decision as described in greater detail with regards to FIG. 8.

FIG. 7 shows an illustration depicting idle and non-idle data collection mode 700 and duty cycle calculation equation 722. As illustrated, working data bin 702 may receive up to n number of output sample data voltage measurements from WIF sensor 114 located inside separator 112. As shown by balloon 722, a cumulative data sum may be incrementally updated as each new output data sample is collected. For example, when an output data sample voltage measurement received from WIF sensor 114 indicates that the prongs of WIF sensor are submerged in water, the cumulative data sum may be increased by one. After an nth output data sample is collected, the cumulative data sum may be stored as a store water sum as shown at 714 and a bin counter may be increased by one as shown at 708. A next working data bin 704 may then receive n output data sample voltage measurements from WIF sensor 114. A second store water sum may then be stored as shown at 716 and bin counter 708 may be accordingly increased by one.

The collecting and processing of output data sample voltage measurements from WIF sensor 114 may repeat until the bin counter reaches a predetermined value of y as shown at 712. All store water sum values up to store water sum(y) 718 may then be tallied as part of duty cycle equation 720. To complete the duty cycle calculation, the store water sum tally may then be divided by the product of the bin size (n) and the number of bins (y). This duty cycle calculation represents the percentage of data sample voltage measurements that indicate that the prongs of WIF sensor 114 are submerged in water.

After the bin counter reaches a value of y and a duty cycle has been calculated (and the working data bins are therefore currently full) as shown at 712, the output data sample voltage measurements occupying the initial working data bin 702 may be deleted and the initial store water sum 714 may also be deleted from the queue of store water sum values as shown at 716. Each subsequent store water sum value may then be moved up one position in the queue of water sum values. A single additional working data bin 706 may then be processed and a new duty cycle may then be calculated. The data occupying the first working data bin position and corresponding store water sum may then be deleted and the data collection, data processing and duty cycle calculation may be repeated.

FIG. 8 shows a flow chart depicting an example routine 800 for determining whether there is a water condition or no-water condition within fuel-water separator 112. At 802, it may be judged whether there are an adequate number of calibratable idle-events to calculate a duty cycle. If the answer at 802 is yes, at 804 it may be judged whether the idle duty cycle is greater than a threshold value X at 804. Alternatively, if the answer at 802 is no, routine 800 may proceed to 808. In some embodiments, a minimum distance travelled between duty cycle average points may also be utilized as an additional criteria for making a duty cycle calculation. This calculation may be made via a vehicle speed sensor or longitudinal accelerometer, for example. By designating a minimum distance travelled between duty cycle average points as an additional criteria for making a duty cycle calculation, noise effects produced during heavy data collection periods (such as stop-and-go traffic, for example) may be mitigated.

If it is judged at 804 that the idle duty cycle is greater than a threshold value X, then it is determined that there is a water condition within fuel-water separator 112. Therefore, as depicted at 806, a WIF light may be illuminated to alert a driver to the presence of a water-in-fuel condition and a WIF code will be set and recorded by the vehicle computer diagnostic system. If it is judged at 804 that the idle duty cycle is less than or equal to a threshold value X, the routine may proceed to 808.

At 808, it may be judged whether there are an adequate number of calibratable non-idle events to calculate a non-idle duty cycle. If the answer at 808 is yes, then it may be judged at 810 whether the non-idle duty cycle is greater than a threshold idle duty cycle $y_1$. Alternatively, if the answer at 808 is no, then routine 800 may return to 802 and a subsequent iteration of routine 800 will be performed. If, at 810, the non-idle duty cycle is judged to be greater than a threshold non-idle duty cycle $y_1$, then it may be determined that there is a water condition within fuel-water separator 112. As depicted at 812, a WIF light may thus be illuminated to alert a driver to the presence of a water-in-fuel condition and a WIF diagnostic code may be set and recorded by the vehicle computer diagnostic system.

If it is judged at 810 that the non-idle duty cycle is less than or equal to a threshold non-idle duty cycle value $y_1$, then routine 800 may proceed to 814. At 814, it may be judged whether the non-idle duty cycle is less than a threshold value $y_2$. If the answer at 814 is yes, then it may be determined that there is a no-water condition within fuel-water separator 112.

If the answer at 814 is no, then routine 800 will return to 802 and a subsequent iteration of routine 800 may be performed. As depicted at 816, a WIF light may thus be deactivated and a WIF diagnostic code may be cleared from the memory of the vehicle computer diagnostic system if the previous water vs. no-water decision via routine 800 determined that a water-in-fuel condition was present in fuel-water separator 112. In other words, the WIF light may be deactivated only when two conditions are met: the idle duty cycle is less than or equal to a certain threshold value $y_1$ and the non-idle duty cycle is less than a threshold value $y_2$. Contrastingly, activation of the WIF light requires only one of two conditions to be met: the idle duty cycle is greater than a threshold value X or the non-idle duty cycle is greater than a threshold value $y_1$.

Note that the example routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system, where the code is executable by the computer.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle having a fuel system that may be contaminated with water, comprising:
- automatically adjusting an operating parameter of a vehicle diagnostic system in response to a number of indications of a presence of water in fuel output from a binary water-in-fuel sensor relative to a total number of output indications from the binary water-in-fuel sensor; and
- adjusting an actuator of an engine in response to the operating parameter.

2. The method of claim 1, where the operating parameter includes a diagnostic code set responsive to fewer readings of water in fuel during idle conditions and more readings of water in fuel during non-idle conditions.

3. The method of claim 1, where a duty cycle is determined from the number of indications of the presence of water in fuel output from the binary water-in-fuel sensor, and further comprising designating a minimum distance travelled between duty cycle average points.

4. The method of claim 1, where the number of indications of the presence of water in fuel occur during transient fuel system conditions and include fuel sloshing conditions.

5. The method of claim 4, where a duty cycle is determined from the number of indications of the presence of water in fuel when vehicle speed is above a threshold value.

6. The method of claim 5, wherein the operating parameter is adjusted responsive to a first number of indications of the presence of water in fuel during the transient fuel system conditions and wherein the operating parameter is adjusted responsive to a second number of indications of the presence of water in fuel during engine idle conditions, where a diagnostic code is adjusted in response to both the first and second number of indications.

7. The method of claim 6, where the first and second number of indications of the presence of water in fuel includes a plurality of indications of the presence of water in fuel during idle and non-idle conditions, and where the idle and non-idle conditions are separately processed.

8. A system for a vehicle, comprising:
- a fuel system having a fuel-water separator;
- a multi-prong binary water-in-fuel sensor coupled to the separator, the multi-prong binary water-in-fuel sensor providing a first output when in contact with water and a second output when in contact with fuel;
- a diagnostic system coupled in the vehicle for receiving sensor outputs from the multi-prong binary water-in-fuel sensor, and adjusting an operating parameter indicative of water in fuel during agitation of the fuel system based on a first number of indications of a presence of water in fuel output from the multi-prong binary water-in-fuel sensor relative to a total number of output indications from the multi-prong binary water-in-fuel sensor over a predefined interval; and
- a control system including executable code stored in non-transitory memory to adjust an engine actuator in response to the operating parameter indicative of water in fuel.

9. The system of claim 8, where the separator is a horizontally mounted separator.

10. The system of claim 8, where the diagnostic system sets a diagnostic code based on a determination of an amount of water in the system, where the amount of water is determined in response to a duty cycle related to the first number of indications of the presence of water in fuel, the duty cycle formed from fewer readings during idle conditions and more readings during non-idle conditions.

11. The system of claim 10, where the agitation includes non-idle vehicle conditions.

12. The system of claim 8, where the diagnostic system further adjusts the operating parameter responsive to a second number of indications of the presence of water in fuel during idle conditions.

13. The system of claim 12, where the multi-prong binary water-in-fuel sensor provides a binary voltage signal.

14. The system of claim 13, where the first number of indications of the presence of water in fuel output from the multi-prong binary water-in-fuel sensor relative to the total number of output indications from the multi-prong binary water-in-fuel sensor over the predefined interval provides a duty cycle.

15. The system of claim 14, where the multi-prong binary water-in-fuel sensor senses conductivity of fluid in the fuel-water separator.

16. A method for determining a presence of water in fuel within a liquid containing fuel-water separator, comprising:
- automatically adjusting a diagnostic code of a vehicle diagnostic system in response to a first duty cycle based on a first ratio of samples from a voltage signal generated by a multi-prong binary water-in-fuel sensor coupled in the fuel-water separator during high agitation conditions, and in response to a second duty cycle based on a second ratio of samples from the voltage signal during low agitation conditions, the multi-prong binary water-in-fuel sensor sensing conductivity of the liquid, where the diagnostic code is set to indicate the presence of water in fuel when the first or second duty cycles fall outside of different individual ranges, and where the diagnostic code is re-set to indicate acceptable operation only when the first duty cycle falls within its individual range; and
- adjusting an actuator of an engine in response to the diagnostic code.

* * * * *